(12) United States Patent
Nada

(10) Patent No.: US 7,548,861 B2
(45) Date of Patent: Jun. 16, 2009

(54) SPEECH RECOGNITION SYSTEM

(75) Inventor: Toru Nada, Inazawa (JP)

(73) Assignee: DENSO CORPORATION, Kariya (JP)

( * ) Notice: Subject to any disclaimer, the term of this patent is extended or adjusted under 35 U.S.C. 154(b) by 484 days.

(21) Appl. No.: 11/511,238

(22) Filed: Aug. 29, 2006

(65) Prior Publication Data
US 2007/0055531 A1 Mar. 8, 2007

(30) Foreign Application Priority Data
Aug. 31, 2005 (JP) .............................. 2005-251895

(51) Int. Cl.
*G10L 11/00* (2006.01)
(52) U.S. Cl. ..................... 704/270; 704/275; 704/270.1
(58) Field of Classification Search ................. 704/270, 704/231, 271, 272, 273, 274, 275, 270.1, 704/276
See application file for complete search history.

(56) References Cited
U.S. PATENT DOCUMENTS
6,185,535 B1 * 2/2001 Hedin et al. ................. 704/270
6,415,258 B1 * 7/2002 Reynar et al. ............... 704/275

FOREIGN PATENT DOCUMENTS
JP H8-54894 A 2/1996

* cited by examiner

*Primary Examiner*—Huyen X. Vo
(74) *Attorney, Agent, or Firm*—Posz Law Group, PLC

(57) ABSTRACT

An audio operating unit of an audio apparatus is used for speech recognition. Specifically, when it is determined that a speech recognition start switch has been pressed, a speech recognition apparatus outputs a signal indicating volume down to a mute level to an audio-apparatus main body of the audio apparatus via an in-vehicle LAN. In addition, a signal indicating that speech recognition is in operation is outputted to various ECUs via the in-vehicle LAN so that speech recognition is performed. The audio-apparatus main body that has acquired the signal indicating volume down to a mute level lowers the volume to the mute level, while ignoring an output signal from the audio operating unit. On the other hand, the speech recognition apparatus executes a process related to speech recognition by, e.g., selecting or determining one of candidate words based on the output signal from the audio operating unit.

28 Claims, 7 Drawing Sheets

SPEECH INPUT : "AICHI PREFECTURE"

SPEAKER : "AKITA PREFECTURE"

SPEECH RECOGNITION SYSTEM

CROSS REFERENCE TO RELATED APPLICATION

This application is based on and incorporates herein by reference Japanese Patent Application No. 2005-251895 filed on Aug. 31, 2005.

FIELD OF THE INVENTION

The present invention relates to a speech recognition apparatus that determines a syllable or word intended by a speaker based on a speech inputted thereto by the speaker.

BACKGROUND OF THE INVENTION

A speech recognition apparatus which determines, based on a speech inputted thereto by a speaker, individual monosyllables intended by the speaker on a one-by-one basis has been widely known. In addition, a speech recognition apparatus which receives multiple syllables as one word has also been widely known. Such speech recognition apparatuses include one which displays multiple candidate speech patterns on a display unit when they are found as a result of the speech recognition described above such that the speaker selects a desired one of the candidates with a speech input (see, e.g., Patent Document 1).

On the other hand, there is a speech recognition apparatus comprising an operating unit such as a key switch for effectively narrowing down multiple candidates as described above to a few.

Patent Document 1: JP-H8-54894 A (FIG. 2)

However, when an operating unit such as a key switch is disposed on the periphery of a steering wheel or an instrument panel in a speech recognition system as described above, an extra space is needed. This causes the problems of, e.g., an increased number of wires and an increased number of components.

SUMMARY OF THE INVENTION

The present invention has been achieved in view of such problems and it is an object of the present invention to provide a speech recognition system with increased convenience without increasing the number of operating units.

According to an aspect of the present invention, a speech recognition system in a vehicle is provided with the following. A speech recognition apparatus is included for performing speech recognition. An electronic apparatus is included for performing at least a specified operation. A communication network is included, wherein the speech recognition apparatus and the electronic apparatus are communicative via the communication network. The speech recognition apparatus includes (i) a notifying unit for transmitting, when performing speech recognition, an operating signal indicating that the speech recognition is in operation to the electronic apparatus, (ii) a speech recognizing unit for performing speech recognition to specify a candidate for a speech inputted by a user, (iii) a reporting unit for reporting the specified candidate so as to require the user to indicate an instruction, and (iv) a first control unit for executing, when receiving an instruction signal indicating an operation performed by the user, a subsequent process based on the received instruction signal. The electronic apparatus includes (i) a receiving unit for receiving an operation performed by the user and generating a corresponding instruction signal and (ii) a second control unit. When not receiving the operating signal, the second control unit determines that the instruction signal is not related to speech recognition and executing the specified operation based on the instruction signal. When receiving the operating signal, the second control unit determines that the instruction signal is related to speech recognition and transmits, without executing the specified operation based on the instruction signal, the instruction signal to the speech recognition apparatus. The speech recognition apparatus then executes the subsequent process based on the instruction signal transmitted from the electronic apparatus.

According to another aspect of the present invention, a speech recognition system in a vehicle is provided with the following. A speech recognition apparatus is included for performing speech recognition. An electronic apparatus is included for performing at least a specified operation. An operating panel is included for distributing an instruction signal corresponding to an operation performed by a user. A communication network is included, wherein the speech recognition apparatus, the operating panel, and the electronic apparatus are mutually communicative via the communication network. The speech recognition apparatus includes: (i) a first receiving unit for receiving the instruction signal from the operating panel; (ii) a notifying unit for transmitting, when performing speech recognition, an operating signal indicating that the speech recognition is in operation to the electronic apparatus; (iii) a speech recognizing unit for performing speech recognition to output a candidate for a speech inputted by a user; (iv) a reporting unit for reporting the candidate so as to require the user to indicate an instruction; and (v) a first control unit for executing, when receiving an instruction signal specifying an item from the candidate by the instruction performed by the user via the operating panel, a subsequent process based on the received instruction signal from the operating panel. The electronic apparatus includes: (i) a second receiving unit for receiving the instruction signal from the operating panel performed by the user; and (ii) a second control unit. When not receiving the operating signal, the second control unit determines that the instruction signal is not related to speech recognition and executing the specified operation based on the instruction signal. When receiving the operating signal, the second control unit determines that the instruction signal is related to speech recognition and stops executing the specified operation based on the instruction signal. The speech recognition apparatus then executes the subsequent process based on the instruction signal transmitted from the operating panel.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
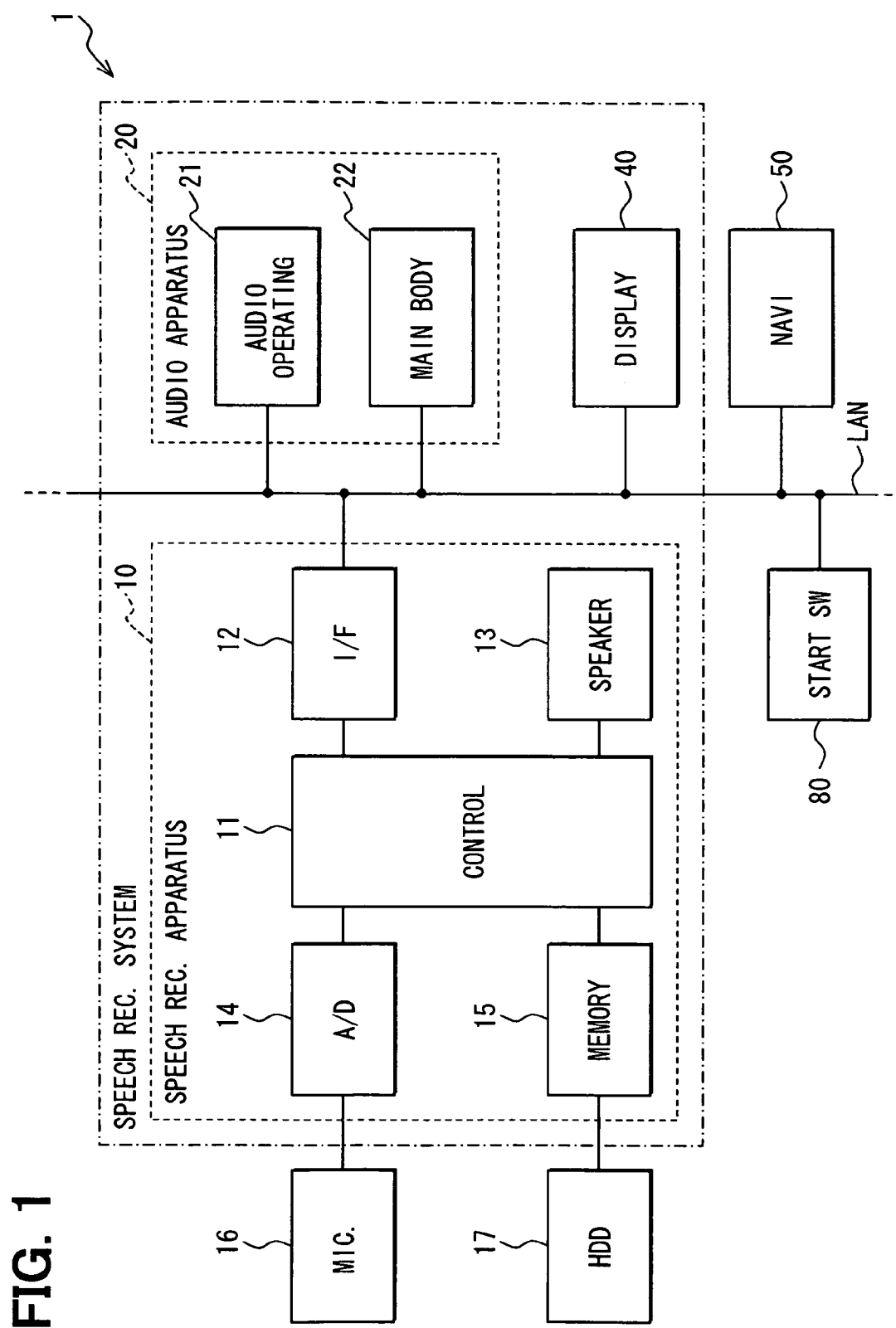
FIG. 1 is a diagram of a schematic structure of a speech recognition system according to a first embodiment of the present invention.

Referring now to the drawings, the individual embodiments of the present invention will be described herein below.

First Embodiment

Figure 2:
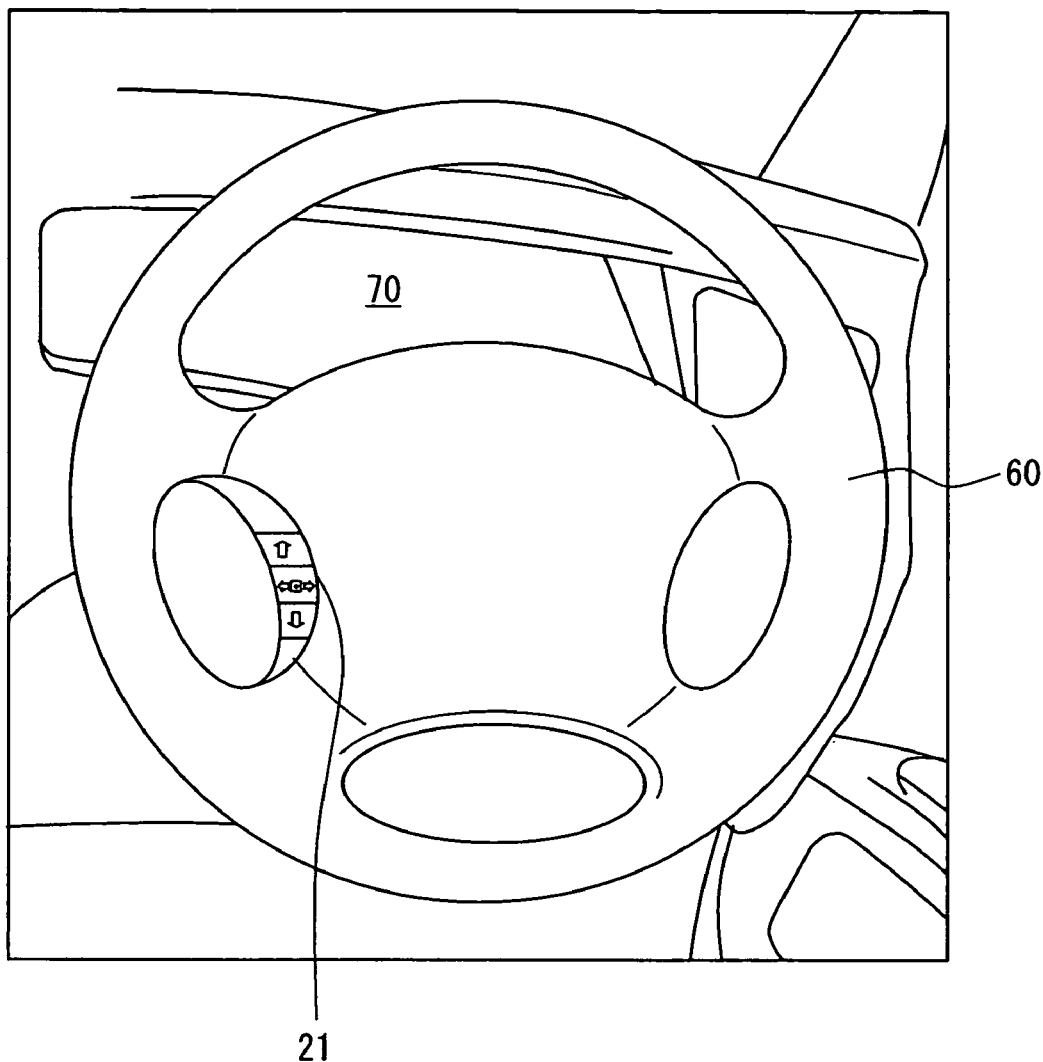
FIG. 2 is an illustrative view showing a steering wheel in which the operating unit of an audio apparatus in the speech recognition system according to the first embodiment is disposed.
Figure 3:
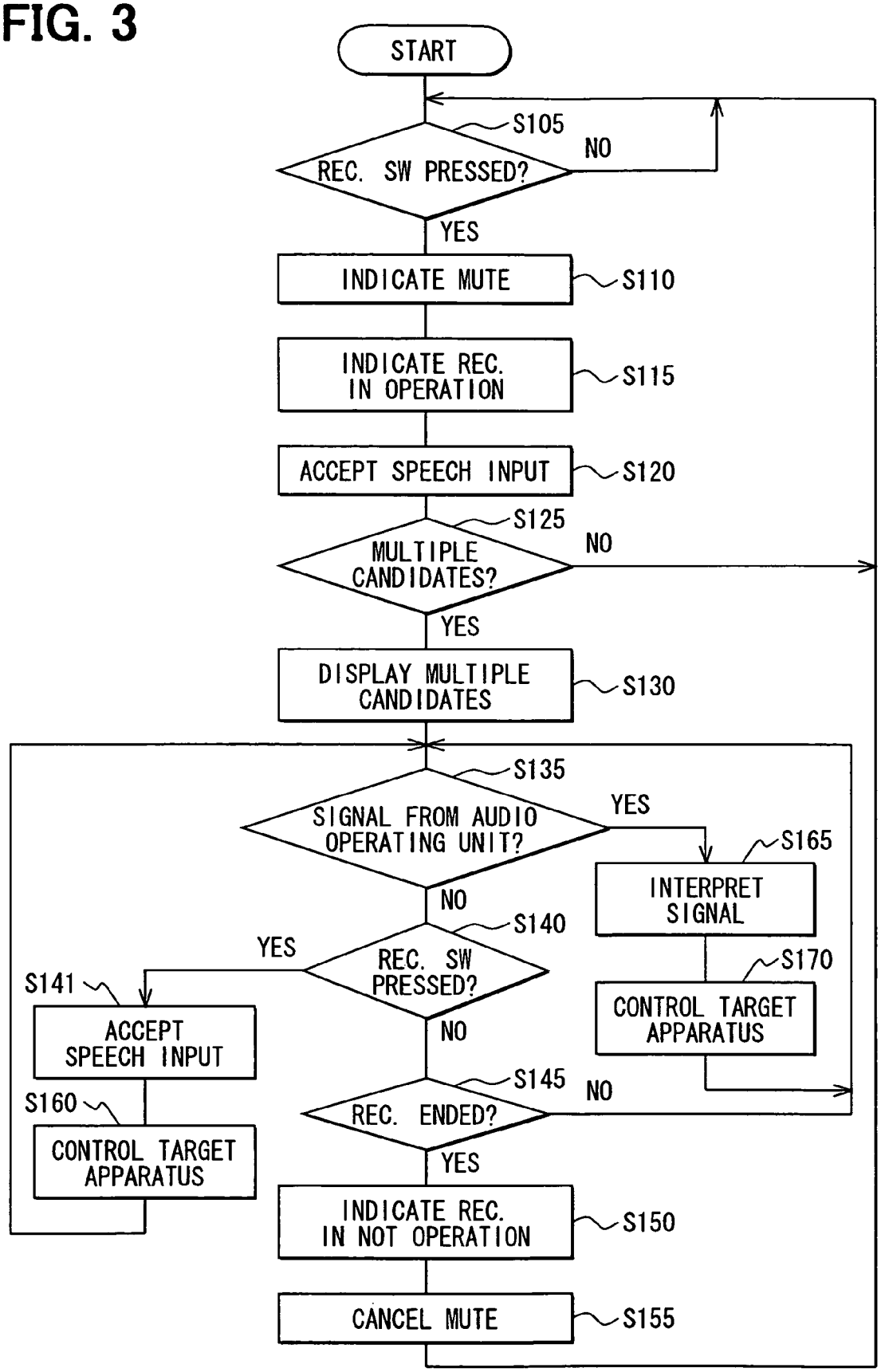
FIG. 3 is a flowchart diagram for illustrating a speech recognition process (1)

FIG. 1 is a diagram of a schematic structure of a speech recognition system according to a first embodiment of the present invention. FIG. 2 is an illustrative view showing a steering wheel in which the operating unit of an audio apparatus in the speech recognition system according to the first embodiment is disposed.

-Structure of Speech Recognition System 1-

As shown in FIG. 1, a speech recognition system 1, which is mounted on a subject vehicle, includes a speech recognition apparatus 10, an audio apparatus 20, and a display unit 40 for displaying various information items. The audio apparatus 20 is an electronic apparatus comprised of an audio operating unit (or audio operating panel) 21 and an audio-apparatus main body 22. The audio operating unit 21 and the audio-apparatus main body 22 are constructed as separate individual parts. The speech recognition apparatus 10, the audio operating unit 21, the audio-apparatus main body 22, and the display unit 40 are connected to be mutually communicative via an in-vehicle LAN (Local Area Network).

In the present embodiment, the audio apparatus 20 is allowed not to use a signal received from the audio operating unit 21 for performing a specified operation when the speech recognition apparatus is performing speech recognition. Further, the audio apparatus 20 has a function not to disturb the operation of the speech recognition when the speech recognition apparatus 10 is performing speech recognition. In other words, in the audio apparatus 20, a function of the specified operation, which may disturb the operation of the speech recognition, becomes invalidated during the speech recognition. Therefore, the present embodiment uses the audio operating unit 21 of the audio apparatus 20 for speech recognition in the speech recognition system 1.

To the in-vehicle LAN mentioned above, an onboard navigation apparatus 50 and various ECUs (Electronic Control Units) not shown are connected. Since the respective structures of the onboard navigation apparatus 50 and the various ECUs are compliant with known technologies, the detailed description thereof will be omitted herein.

-Description of Structure of Speech Recognition Apparatus 10-

The speech recognition apparatus 10 comprises: an I/F 12 for performing communication with the in-vehicle LAN; a speaker 13 for outputting various guide speeches and the like; an A/D converter 14 for converting a speech inputted from a microphone 16 to a digital signal; a memory device 15 for inputting and outputting data related to speech recognition to and from a HDD (Hard Disk Drive) 17; and a control unit 11 for controlling each of the components described above. To the A/D (Analog/Digital) converter 14, the microphone 16 for receiving a speech input and outputting speech information is connected.

The I/F (Interface) 12 functions as means for communicating with an outside to be connected to the in-vehicle LAN and capable of communicating with the various ECUs connected to the in-vehicle LAN. As an example of the in-vehicle LAN, a CAN (Control Area Network) can be assumed. As one of the various ECUs, an engine ECU, an AT-ECU, or a body ECU can be assumed.

The memory device 15 is a device for inputting and outputting the various data items stored in the HDD 17 as a medium for storing data related to speech recognition. The HDD 17 stores (i) characteristic parameters for recognizing syllables, (ii) a dictionary composed of specified words, which are for monosyllabic recognition and each of which is comprised of multiple syllables associated on a per monosyllable basis, (iii) a dictionary composed of words each comprised of multiple syllables associated on a per monosyllable basis, and (iv) the like.

The control unit 11 is constituted by a well-known microcomputer as a main constituent, which is composed of a CPU, a ROM, a RAM, an I/O, and bus lines providing connections between these components. The control unit 11 executes various processes based on programs stored in the ROM and the RAM. The control unit 11 can also function as means for executing a speech recognition process, which will be described later.

The control unit 11 also has the function of executing the following process. That is, the control unit 11 determines that speech recognition is being performed (or in operation) as long as a sequence of speech recognition process steps are performed; it then notifies the audio-apparatus main body 22 that the speech recognition is in operation via the I/F 12. The speech recognition is started when the speech recognition apparatus 10 starts to operate in response to an operation by a user and continues over a period including the period, during which a speech uttered by the speaker is inputted to the A/D converter 14 via the microphone 16. The control unit 11 executes a reporting process to report candidates of syllables or words, each of which includes multiple syllables, specified by itself to the display unit 40. The control unit 11 regards a signal received via the I/F 12 from the audio operating unit 21 as a signal indicating that one of the candidates is selected or determined by the speaker. The control unit 11 then determines the candidate indicated by the signal as the speech intended by the speaker.

-Description of Structures of Audio Operating Unit 21, Audio-Equipment Main Body 22, and Display Unit 40-

The audio operating unit 21 is comprised of mechanical key switches provided in a steering wheel 60 and the like (see FIG. 2). Specifically, the audio operating unit 21 outputs a signal indicating an increase or a decrease in volume via the in-vehicle LAN to the various ECUs based on an operation by the user. For easy operation of the audio operating unit 21 by a driver even during driving, the present embodiment disposes the audio operating unit 21 in the steering wheel 60 which is located within reach and sight of the driver in a driver's seat of the vehicle.

The audio-apparatus main body 22 is comprised of a signal switch, a signal amplifier, and the like to amplify an inputted speech signal and output the amplified speech signal to the speaker 13. The audio-apparatus main body 22 also functions means for controlling the following function. That is, when the audio-apparatus main body 22 has not received a signal indicating that speech recognition is in operation from the speech recognition apparatus 10, it determines that the signal received from the audio operating unit 21 is not a signal related to speech recognition and executes a specified operation. On the other hand, when the audio-apparatus main body 22 has received the signal indicating that speech recognition is in operation from the speech recognition apparatus 10, it determines that the signal received from the audio operating unit 21 is a signal related to speech recognition and does not execute the specified operation based on the signal. Here, the audio operating unit 21 functions as means for receiving an instruction based on an operation performed by a user for the speech recognition in addition to the specified operation and for then outputting a signal corresponding to the instruction or the operation by the user.

The display unit 40 is a color display device. Examples of the display unit 40 include a liquid crystal display, an organic EL display, and a CRT, of which any may be used appropriately. The display unit 40 can also display various data items outputted from an onboard navigation apparatus 50, which will be described later. The display unit 40 functions as means for reporting in conjunction with the speaker 13.

-Description of Speech Recognition Process (1)-

A description will be given next to a speech recognition process (1) executed by the control unit 11 of the speech recognition system 1 with reference to the flowchart of FIG. 2 and FIGS. 4A and 4B.

The execution of the speech recognition process (1) is started when the user gives a particular instruction in a state in which a speech input can be received when information is inputted to the speech recognition system 1.

First, the control unit 11 remains on standby while it determines that a speech recognition start switch 80 has not been pressed down (S105: N). When it is determined that the speech recognition start switch 80 has been pressed down (S105: Y), the control unit 11 outputs a signal indicating volume down to a mute level to the audio-apparatus main body 22 via the in-vehicle LAN (S110). The control unit 11 also outputs a signal indicating that speech recognition is in operation to the various ECUs via the in-vehicle LAN (S115). The control unit 11 further receives a speech input as follows. That is, the control unit 11 converts the speech input received via the microphone 16 to a digital signal by using the A/D converter 14 and analyzes the converted digital signal (extracts the characteristic parameters and the like). The control unit 11 then compares the analyzed digital signal with the characteristic parameters for syllables acquired from the HDD 17 via the memory device 15 and selects multiple candidate syllables or candidate words, while giving priorities thereto (S120). At this time, when only one candidate syllable or word has been selected (S125: N), the whole process flow returns to Step S105. When there are multiple selected candidate syllables or words (S125: Y), the control unit 11 controls the display unit 40 such that the plurality of candidate syllables or words are displayed (S130).

Subsequently, the control unit 11 determines whether or not a signal has been outputted from the audio operating unit 21 via the in-vehicle LAN (S135). When it is determined that the signal has been outputted from the audio operating unit 21 via the in-vehicle LAN (S135: Y), the control unit 11 interprets/determines the content of the signal (S165) and controls a target apparatus (S170). In the present embodiment, the target apparatus is the audio apparatus 20.

Figure 4A:
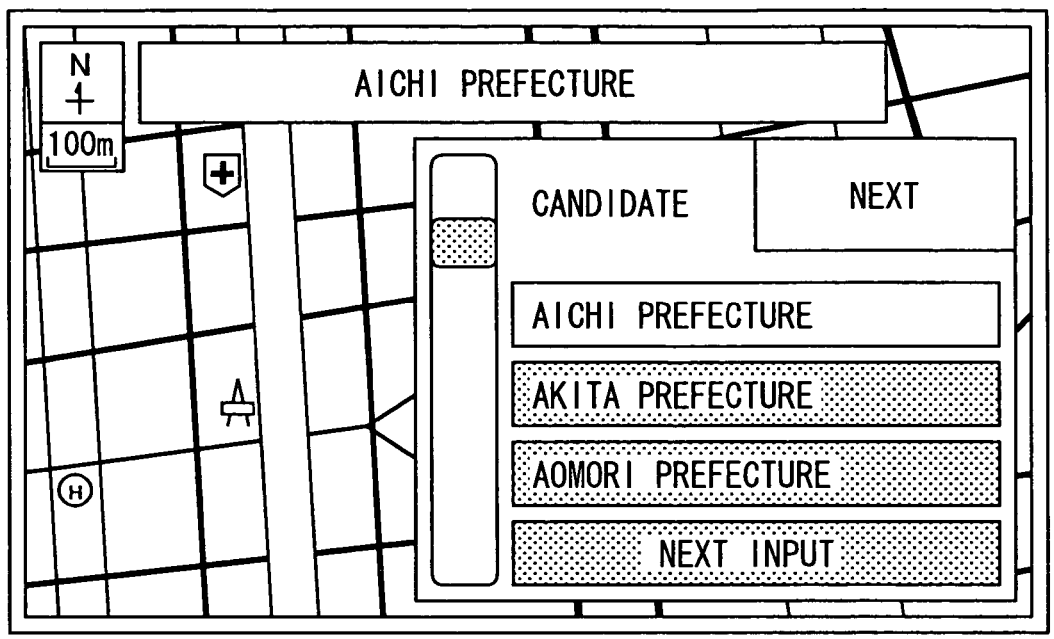
FIG. 4A is a view illustrating an example of the speech recognition process.
Figure 4B:
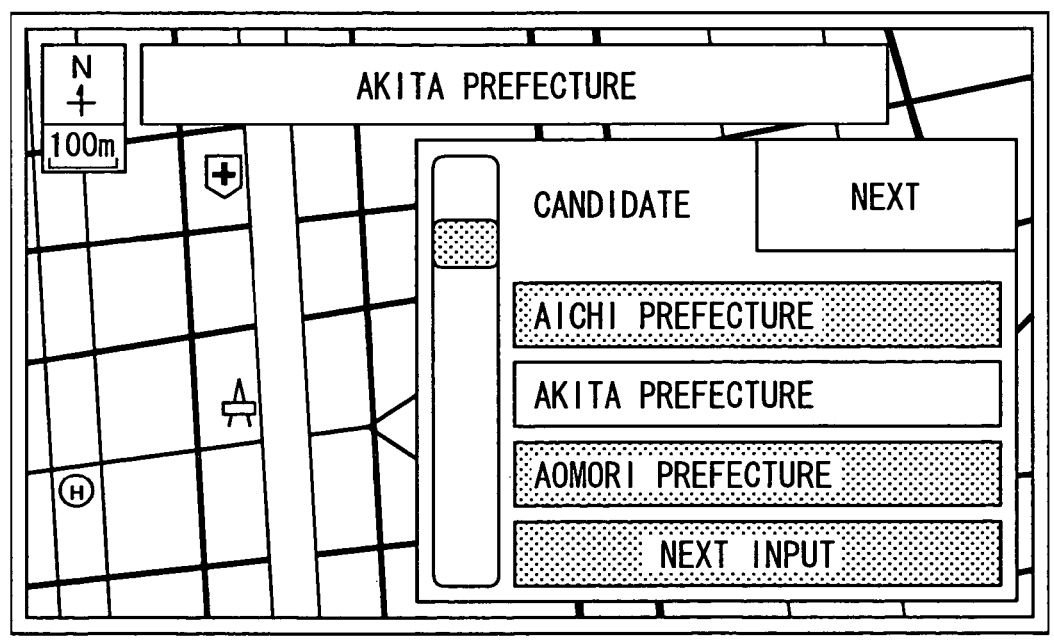
FIG. 4B is a view illustrating an example of the speech recognition process.

For example, FIGS. 4A and 4B illustrate an example of a selection process. In FIG. 4A, although a speech input was "Akita Prefecture," "Aichi Prefecture" is listed at the top priority level with "Akita Prefecture" on the lower level. In FIG. 4B, after the selection process, "Akita Prefecture" is selected from within the plurality of candidate words and outputted via the speaker 13. In this case, the control unit 11 interprets that the signal from the audio operating unit 21 indicates the selection of the one of the plurality of candidate words which is on the lower level and changes the selected candidate word from "Aichi Prefecture" (see FIG. 4A) to "Akita Prefecture" (see FIG. 4B). Simultaneously, the selected candidate word "Akita Prefecture" is pronounced via the speaker 13. The whole process flow then returns to Step S135.

On the other hand, when it is determined that the signal has not been outputted from the audio operating unit 21 via the in-vehicle LAN (S135: N), the control unit 11 determines whether or not the speech recognition start switch 80 has been pressed down (S140). When it is determined that the speech recognition start switch 80 has been pressed down (S140: Y), the control unit 11 receives a speech input (S141) and controls the target apparatus in accordance with the result of speech recognition (S160). The whole process flow then returns to Step S135.

On the other hand, when it is determined that the speech recognition start switch 80 has not been pressed down (S140: N), the control unit 11 determines whether or not a sequence of operations associated with speech recognition have ended (S145). When it is determined that the sequence of operations associated with speech recognition have not ended (S145:N), the whole process flow returns to Step S135. On the other hand, when it is determined that the sequence of operations associated with speech recognition have ended (S145: Y), the control unit 11 outputs a signal indicating that speech recognition is not in operation to the various ECUs via the in-vehicle LAN (S150). Then, the control unit 11 outputs the signal indicating cancellation of volume down to a mute level to the audio-apparatus main body 22 via the in-vehicle LAN (S155). The whole process then returns to Step S105.

Effects of First Embodiment (1) Thus, in the speech recognition system 1 according to the first embodiment, the audio operating unit 21 of the audio apparatus 20 is used for speech recognition. That is, when it is determined that the speech recognition start switch 80 has been pressed down (S105: Y), the signal indicating volume down to a mute level is outputted to the audio-apparatus main body 22 via the in-vehicle LAN (S110). In addition, the signal indicating that speech recognition is in operation is outputted to the various ECUs via the in-vehicle LAN (S115) so that speech recognition is executed. When it is determined that the signal from the audio operating unit 21 has been outputted via the in-vehicle LAN (S135: Y), the content of the signal is interpreted/determined (S165) so that the audio apparatus 20 as the target apparatus is controlled (S170). Thus the first embodiment uses the audio operating unit 21 constructed as the separate part from the audio-apparatus main body 22 for the speech recognition system 1. The convenience of the speech recognition system 1 can be increased without increasing the number of operating units.

(2) In addition, in the speech recognition system 1 according to the first embodiment, the audio operating unit 21 is disposed in the steering wheel 60. As a result, the driver is allowed to easily operate the audio operating unit 21 even during driving and the convenience of the speech recognition system 1 can be increased.

Second Embodiment

In the speech recognition system 1 according to the first embodiment described above, the audio operating unit 21 and main body 22 of the audio apparatus 20 have been constructed as the separate individual parts. By contrast, in a speech recognition system 101 according to the second embodiment of the present invention, an audio apparatus 120 is an electronic apparatus to include an audio operating unit (or an audio operating panel) 121 and an audio-apparatus main body 122 in a single assembly.

Figure 5:
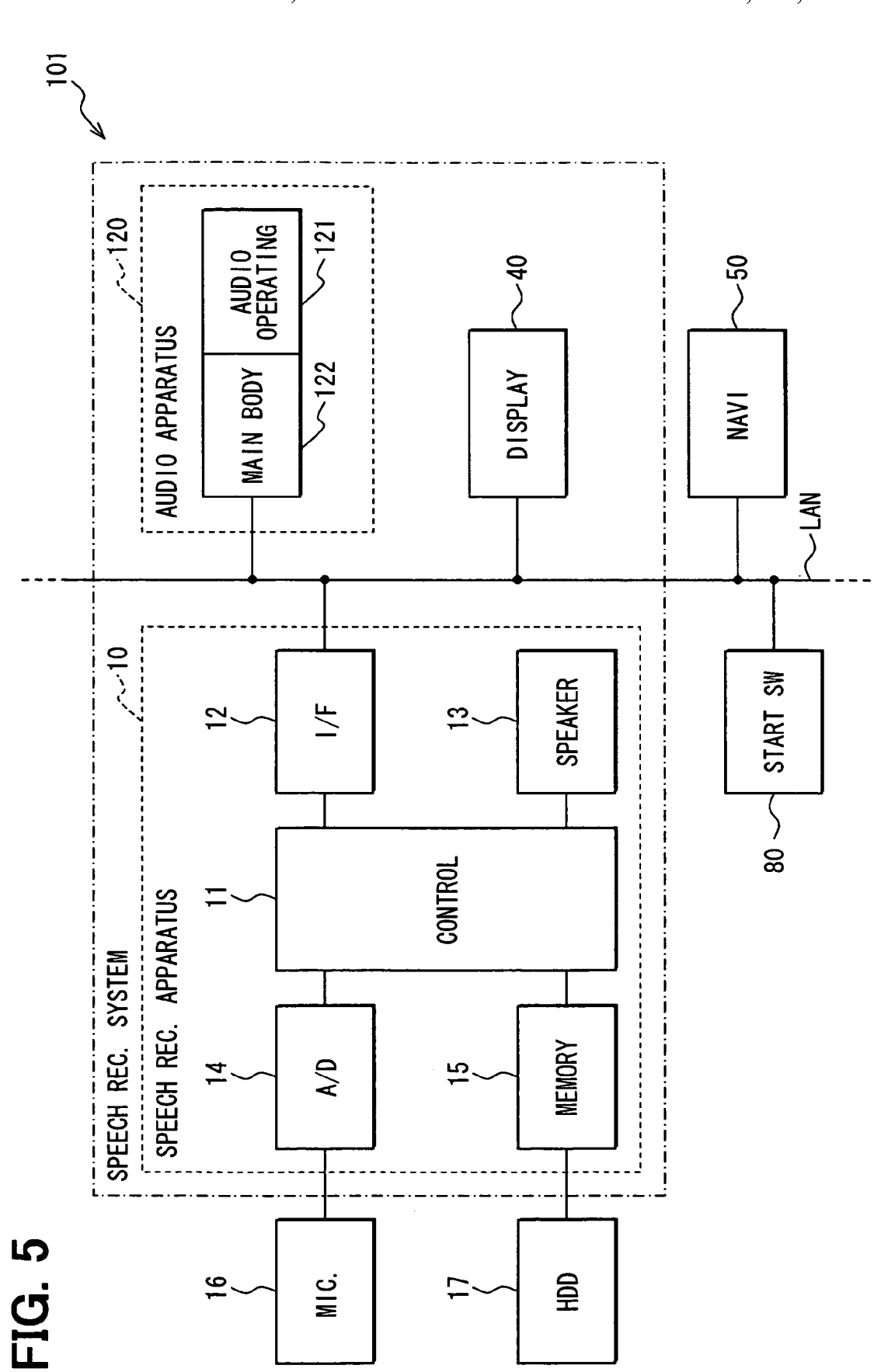
FIG. 5 is a diagram of a schematic structure of a speech recognition system according to a second embodiment of the present invention.
Figure 6:
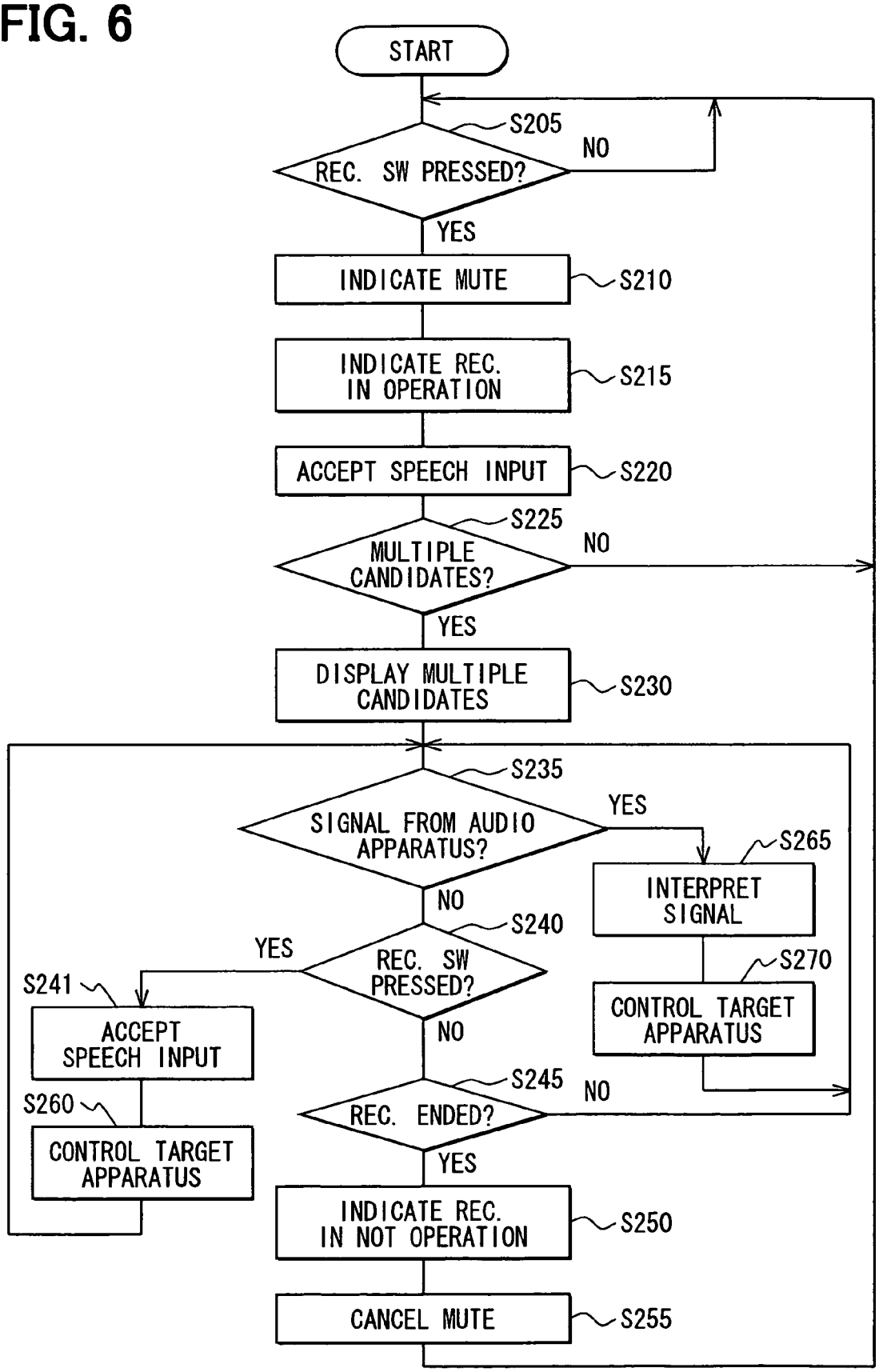
FIG. 6 is a flowchart diagram for illustrating a speech recognition process (2)

As shown in FIG. 5, the speech recognition system 101 is mounted on a vehicle and is comprised of the speech recognition apparatus.10, the audio apparatus 120, and the display unit 40. Since the speech recognition apparatus 10 and the display unit 40 according to the second embodiment are common to the speech recognition apparatus 10 and the display unit 40 provided in the speech recognition system 1 according to the first embodiment, the description thereof will be omitted by using the same reference numerals as used for the speech recognition system 1 according to the first embodiment. The speech recognition apparatus 10, the audio apparatus 120, and the display unit 40 are connected to be mutually communicative via an in-vehicle LAN. To the in-vehicle LAN mentioned above, the onboard navigation apparatus 50 and various ECUs not shown are connected.

-Description of Structure of Audio Equipment 120-

The audio operating unit 121 outputs a signal indicating an increase or a decrease in volume to the audio-apparatus main body 122 based on an operation by the user.

The audio-apparatus main body 122 is composed of a signal switch, a signal amplifier, and the like to amplify an inputted speech signal and output the amplified speech signal to the speaker 13.

The audio-apparatus main body 122 also has the following function. That is, when the audio-apparatus main body 122 has not received a signal indicating that speech recognition is in operation, it determines that the signal indicating the operation that has been received by the audio operating unit 121 is not a signal related to speech recognition and executes a specified operation based on the signal without transmitting the signal to the speech recognition apparatus 10. When the audio-apparatus main body 122 has received the signal indicating that speech recognition is in operation, it determines that the signal indicating the operation that has been received by the audio operating unit 121 is a signal related to speech recognition and transmits the signal to the speech recognition apparatus 10 without executing the specified operation based on the signal. It is also possible to allow the speech recognition apparatus 10 to receive the signal from the audio operating unit 121 and make a spontaneous determination.

In the present embodiment, the audio apparatus 120 is allowed not to use for performing the specified operation the signal, which indicates an operation and has been received by the audio operating unit 121 during speech recognition. The audio apparatus 120 further has a function not to disturb the operation of the speech recognition during speech recognition. In other words, in the audio apparatus 120, a function of the specified operation, which may disturb the operation of the speech recognition, becomes invalidated during the speech recognition. Therefore, the present embodiment uses the audio operating unit 121 of the audio apparatus 120 for speech recognition in the speech recognition system 1.

-Description of Speech Recognition Process (2)-

A description will be given next to a speech recognition process (2) executed by the control unit 11 of the speech recognition system 101 with reference to the flowchart of FIG. 5.

The execution of the speech recognition process (2) is started when the user gives a particular instruction in a state in which a speech input can be received when information is inputted to the speech recognition system 101.

First, the control unit 11 remains on standby while it determines that the speech recognition start switch 80 has not been pressed down (S205: N). When it is determined that the speech recognition start switch 80 has been pressed down (S205: Y), the control unit 11 outputs the signal indicating volume down to a mute level to the audio apparatus 120 via the in-vehicle LAN (S210). The control unit 11 also outputs the signal indicating that speech recognition is in operation to the various ECUs via the in-vehicle LAN (S215). The control unit 11 further receives a speech input as follows. That is, the control unit 11 converts the speech input received via the microphone 16 to a digital signal by using the A/D converter 14 and analyzes the digital signal resulting from the conversion (extracts the characteristic parameters and the like). The control unit 11 then compares the analyzed digital signal with the characteristic parameters for syllables acquired from the HDD 17 via the memory device 15 and selects multiple candidate syllables or words, while giving priorities thereto (S220). At this time, when only one candidate syllable or word has been selected (S225: N), the whole process flow returns to Step S205. When there are multiple selected candidate syllables or words (S225: Y), the control unit 11 controls the display unit 40 such that the plurality of candidate syllables or words are displayed (S230).

Subsequently, the control unit 11 determines whether or not a signal has been outputted from the audio apparatus 120 via the in-vehicle LAN (S235). When it is determined that the signal has been outputted from the audio apparatus 120 via the in-vehicle LAN (S235: Y), the control unit 11 interprets/determines the content of the signal (S265) and controls a target apparatus (S270). In the present embodiment, the target apparatus is the audio apparatus 120. The whole process flow then returns to Step S235. On the other hand, when it is determined that the signal has not been outputted from the audio apparatus 120 via the in-vehicle LAN (S235: N), the control unit 11 determines whether or not the speech recognition start switch 80 has been pressed down (S240). When it is determined that the speech recognition start switch 80 has been pressed down (S240: Y), the control unit 11 receives a speech input (S241) and controls the target apparatus in accordance with the result of speech recognition (S260). The whole process flow then returns to Step S235.

On the other hand, when it is determined that the speech recognition start switch 80 has not been pressed down (S240: N), the control unit 11 determines whether or not a sequence of operations associated with speech recognition have ended (S245). When it is determined that the sequence of operations associated with speech recognition have not ended (S245:N), the whole process flow returns to Step S235. On the other hand, when it is determined that the sequence of operations associated with speech recognition have ended (S245: Y), the control unit 11 outputs a signal indicating that the speech recognition is not in operation to the various ECUs via the in-vehicle LAN (S250). Then, the control unit 11 outputs the signal indicating cancellation of volume down to a mute level to the audio apparatus 120 via the in-vehicle LAN (S255). The whole process then returns to Step S205.

-Description of Mute Process-

Figure 7:
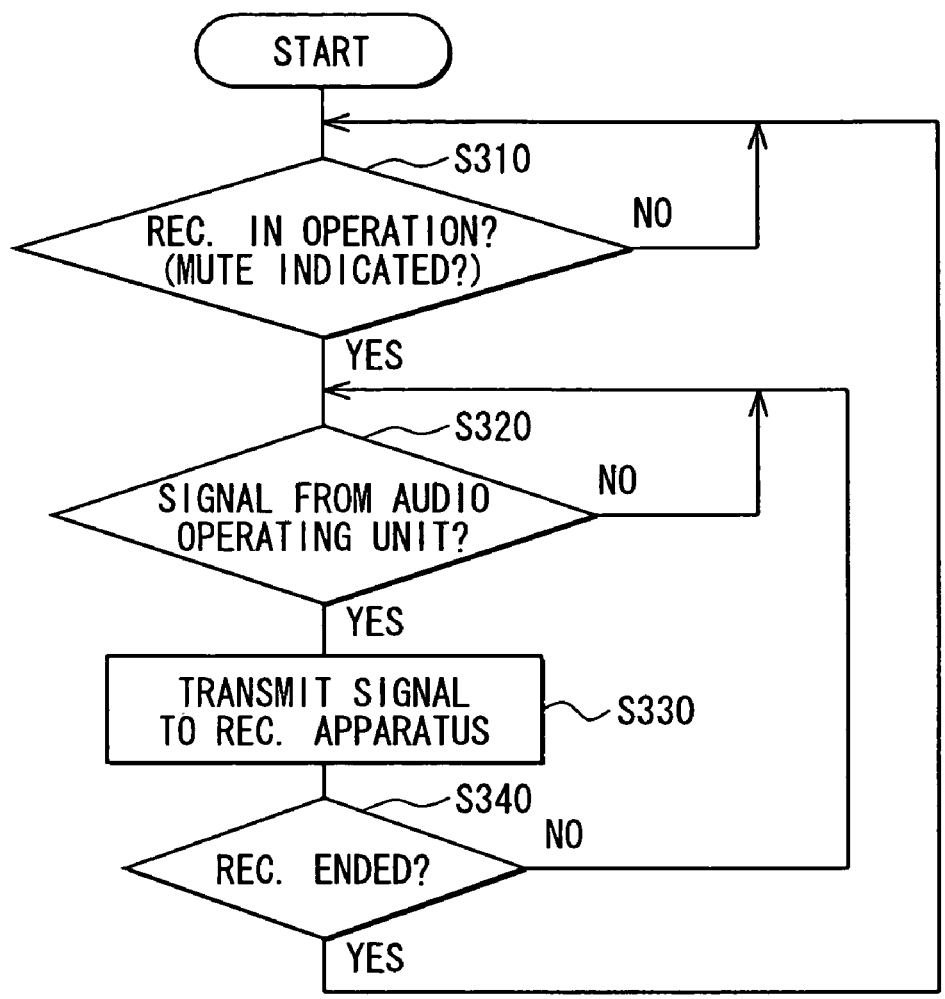
FIG. 7 is a flowchart diagram for illustrating a mute process executed by a control unit of an audio apparatus in the speech recognition system according to the second embodiment.

A description will be given next to a mute process executed by the main body 122 of the audio apparatus 120 with reference to the flowchart of FIG. 7.

The mute process is repeatedly executed when the power source of the audio apparatus 120 is ON.

First, the audio-apparatus main body 122 remains on standby until it determines that an indication that speech recognition is in operation has been received from the sound recognition apparatus 10 (S310: N). When it is determined that the indication that speech recognition is in operation has been received from the sound recognition apparatus 10 (S310: Y), the audio-apparatus main body 122 comes into a state in which it determines whether or not a signal from the audio operating unit 121 is to be transmitted to the speech recognition apparatus 10 (S320). When it is determined that the signal from the audio operating unit 121 is not to be transmitted to the speech recognition apparatus 10 (S320: N), the audio-apparatus main body 122 remains on standby by repeatedly executing Step S320. When it is determined that the signal from the audio operating unit 121 is to be transmitted to the speech recognition apparatus 10 (S320: Y), the audio-apparatus main body 122 transmits the signal to the speech recognition apparatus 10 (S330).

Subsequently, the audio-apparatus main body 122 determines whether or not an indication that speech recognition is not in operation has been received from the speech recognition apparatus 10 (S340). When it is determined that the indication that speech recognition is not in operation has not been received from the speech recognition apparatus 10, the audio-apparatus main body 122 determines that a sequence of speech recognition process steps have not ended (S340: N) so that the whole process flow moves to Step S320. On the other hand, when it is determined that the indication that speech recognition is not in operation has been received from the speech recognition apparatus 10, the audio-apparatus main body 122 determines that the sequence of speech recognition process steps have ended (S340: Y) so that the whole process flow moves to Step S310.

Effects of Second Embodiment (1) Thus, in the speech recognition system 101 according to the second embodiment, the audio operating unit 121 of the audio apparatus 120 is used for speech recognition. That is, when it is determined that the speech recognition start switch 80 has been pressed down (S205: Y), the signal indicating volume down to a mute level is outputted to the audio apparatus 120 via the in-vehicle LAN (S210). In addition, the signal indicating that speech recognition is in operation is outputted to the various ECUs via the in-vehicle LAN (S215) so that speech recognition is executed. When it is determined that the signal from the audio apparatus 120 has been outputted via the in-vehicle LAN (S235: Y), the content of the signal is interpreted/determined (S265) so that the audio apparatus 120 as the target apparatus is controlled (S270). On the other hand, when the audio apparatus 120 determines that the indication that the volume is to be lowered to a mute level has been received from the speech recognition apparatus 10 (S310: Y) and that there is an input from the audio operating unit 121 (S320: Y), it transmits the inputted signal indicating an operation to the speech recognition apparatus 10 (S330).

Thus, by using the audio operating unit 121 of the audio apparatus 120 for speech recognition, the convenience of the speech recognition system 101 can be increased without increasing the number of operating units.

Other Embodiments

Although the individual embodiments of the present invention have been described thus far, the present invention is not limited to the embodiments described above. The present invention can be embodied in the following various forms.

(1) Although the audio operating unit 21 is disposed in the steering wheel 60 in the first embodiment described above, the present invention is not limited thereto. The audio operating unit 21 may also be disposed at another place so long as it is within sight of a driver during driving. For example, the audio operating unit 21 may be disposed on the periphery of an instrument panel 70 (in FIG. 2). In such a structure also, the driver is allowed to easily operate the audio operating unit 21 even during driving and the convenience of the speech recognition system 1 can be increased.

(2) The audio operating unit 21 may also be disposed at another place so long as it is within reach of the driver. For example, the audio operating unit 21 may be disposed on the periphery of the instrument panel 70. In such a structure also, the driver is allowed to easily operate the audio operating unit 21 even during driving and the convenience of the sound recognition system 1 can be increased.

(3) Although the first embodiment has used the audio operating unit 21 of the audio apparatus 20 for speech recognition, the present invention is not limited thereto. It is also possible to use an operating unit of an electronic apparatus for speech recognition so long as the electronic apparatus is allowed not to use a signal, which is received from the operating unit, for performing a specified operation when the speech recognition apparatus is performing speech recognition. For example, the operating unit of the electronic apparatus may be a mirror adjustment switch, a switch of an air conditioner, or the like. In such a structure also, the operation of the electronic apparatus remains unaffected even when the operating unit thereof is used for speech recognition and the convenience of the speech recognition system 1 can be increased.

(4) It is also possible to use an operating unit of an electronic apparatus for speech recognition so long as the function of the electronic apparatus, which disturbs the speech recognition, is invalidated when the speech recognition apparatus is performing speech recognition. For example, the electronic apparatus may be the onboard navigation apparatus 50 or the like. In such a structure also, the operation of the electronic apparatus remains unaffected even when the operating unit thereof is used for speech recognition and the convenience of the speech recognition system 1 can be increased.

(5) Alternatively, the speech recognition apparatus 10 according to each of the embodiments described above may also be implemented by using the structure of the onboard navigation apparatus 50. Such a structure also achieves the same operations and effects achieved by the embodiments described above.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A speech recognition system in a vehicle, the system comprising:
   a speech recognition apparatus for performing speech recognition;

an electronic apparatus for performing at least a specified operation; and a communication network via which the speech recognition apparatus and the electronic apparatus are communicative, wherein the speech recognition apparatus includes:
- a notifying unit for transmitting, when performing speech recognition, an operating signal indicating that the speech recognition is in operation to the electronic apparatus;
- a speech recognizing unit for performing speech recognition to specify a candidate for a speech inputted by a user;
- a reporting unit for reporting the specified candidate so as to require the user to indicate an instruction; and
- a first control unit for executing, when receiving an instruction signal indicating an operation performed by the user, a subsequent process based on the received instruction signal, wherein the electronic apparatus includes:
- a receiving unit for receiving an operation performed by the user and generating a corresponding instruction signal; and
- a second control unit for,
  - when not receiving the operating signal, determining that the instruction signal is not related to speech recognition and executing the specified operation based on the instruction signal, and
  - when receiving the operating signal, determining that the instruction signal is related to speech recognition and transmitting, without executing the specified operation based on the instruction signal, the instruction signal to the speech recognition apparatus, and wherein the speech recognition apparatus then executes the subsequent process based on the instruction signal transmitted from the electronic apparatus.

2. The speech recognition system of claim 1, wherein the receiving unit included in the electronic apparatus is constructed as an independent portion, which is separate from a main body of the electronic apparatus, and the speech recognition apparatus, the receiving unit of the electronic apparatus, and the main body of the electronic apparatus are mutually communicative via the communication network.

3. The speech recognition system of claim 1, wherein the receiving unit is disposed within reach of the user in a driver's seat of the vehicle.

4. The speech recognition system of claim 1, wherein the receiving unit is disposed within sight of the user in a driver's seat of the vehicle.

5. The speech recognition system of claim 1, wherein the receiving unit is disposed in a steering wheel of the vehicle.

6. The speech recognition system of claim 1, wherein the receiving unit is disposed on a periphery of an instrument panel of the vehicle.

7. The speech recognition system of claim 1, wherein the electronic apparatus is allowed not to use the instruction signal for performing the specified operation when the operating signal is received.

8. The speech recognition system of claim 1, wherein the electronic apparatus has a function not to disturb speech recognition when the operating signal is received.

9. The speech recognition system of claim 1, wherein the electronic apparatus includes an audio apparatus, and an audio volume of the audio apparatus is decreased to a mute level when the operating signal is received.

10. The speech recognition system of claim 1, wherein when the candidate specified by the speech recognizing unit includes a plurality of items, the receiving unit is used for the user to select one of the plurality items.

11. The speech recognition system of claim 1, wherein when the candidate specified by the speech recognizing unit includes a plurality of words, the reporting unit reports the specified candidate as the plurality of words to the user and the user is required to select to one of the plurality of words.

12. The speech recognition system of claim 1, wherein the speech recognition apparatus further includes a speech receiving unit for receiving a speech inputted by the user.

13. The speech recognition system of claim 12, wherein the notifying unit transmits the operating signal indicating that the speech recognition is in operation to the electronic apparatus when the speech receiving unit receives a speech inputted by the user.

14. The speech recognition system of claim 1, wherein the speech recognition apparatus further includes a speech recognition start switch for the user to indicate a start of speech recognition, and the notifying unit transmits the operating signal indicating that the speech recognition is in operation to the electronic apparatus when the user indicates a start of speech recognition via the speech recognition start switch.

15. A speech recognition system in a vehicle, the system comprising:

a speech recognition apparatus for performing speech recognition;

an electronic apparatus for performing at least a specified operation;

an operating panel for distributing an instruction signal corresponding to an operation performed by a user; and a communication network via which the speech recognition apparatus, the operating panel, and the electronic apparatus are mutually communicative, wherein the speech recognition apparatus includes:
- a first receiving unit for receiving the instruction signal from the operating panel;
- a notifying unit for transmitting, when performing speech recognition, an operating signal indicating that the speech recognition is in operation to the electronic apparatus;
- a speech recognizing unit for performing speech recognition to output a candidate for a speech inputted by a user;
- a reporting unit for reporting the candidate so as to require the user to indicate an instruction; and
- a first control unit for executing, when receiving an instruction signal specifying an item from the candidate by the instruction performed by the user via the operating panel, a subsequent process based on the received instruction signal from the operating panel, wherein the electronic apparatus includes:
- a second receiving unit for receiving the instruction signal from the operating panel performed by the user; and
- a second control unit for,
  - when not receiving the operating signal, determining that the instruction signal is not related to speech recognition and executing the specified operation based on the instruction signal, and
  - when receiving the operating signal, determining that the instruction signal is related to speech recognition and not executing the specified operation based on the instruction signal, and wherein the speech recognition apparatus then executes the subsequent process based on the instruction signal transmitted from the operating panel.

16. The speech recognition system of claim 15, wherein the operating panel is included in the electronic apparatus and the second control unit included in the electronic apparatus transmits the instruction signal to the speech recognition apparatus.

17. The speech recognition system of claim 15, wherein the operating panel is disposed within reach of the user in a driver's seat of the vehicle.

18. The speech recognition system of claim 15, wherein the operating panel is disposed within sight of the user in a driver's seat of the vehicle.

19. The speech recognition system of claim 15, wherein the operating panel is disposed in a steering wheel of the vehicle.

20. The speech recognition system of claim 15, wherein the operating panel is disposed on a periphery of an instrument panel of the vehicle.

21. The speech recognition system of claim 15, wherein the electronic apparatus is allowed not to use the instruction signal for performing the specified operation when the operating signal is received.

22. The speech recognition system of claim 15, wherein the electronic apparatus has a function not to disturb speech recognition when the operating signal is received.

23. The speech recognition system of claim 15, wherein the electronic apparatus includes an audio apparatus, and an audio volume of the audio apparatus is decreased to a mute level or power of the audio apparatus is turned off when the operating signal is received.

24. The speech recognition system of claim 15, wherein when the candidate outputted by the speech recognizing unit includes a plurality of words as a result of an execution of speech command, the reporting unit reports the specified candidate as the plurality of words to the user and the user is required to select one of the plurality of words and the operating panel is used for the user to select one of the plurality words.

25. The speech recognition system of claim 15, wherein when the candidate output by the speech recognizing unit includes a plurality of words as a result of speech analysis, the reporting unit reports the specified candidate as the plurality of words to the user and the user is required to select one of the plurality of words.

26. The speech recognition system of claim 15, wherein the speech recognition apparatus further includes a speech receiving unit for receiving a speech inputted by the user.

27. The speech recognition system of claim 26, wherein the notifying unit transmits the operating signal indicating that the speech recognition is in operation to the electronic apparatus when the speech receiving unit receives a speech inputted by the user.

28. The speech recognition system of claim 15, wherein the speech recognition apparatus further includes a speech recognition start switch for the user to indicate a start of speech recognition, and the notifying unit transmits the operating signal indicating that the speech recognition is in operation to the electronic apparatus when the user indicates a start of speech recognition via the speech recognition start switch.

* * * * *